3,201,482
STABILIZATION OF METHYL CHLOROFORM
Robert H. Fredenburg, Barberton, Ohio, assignor, by mesne assignments, to Pittsburgh Plate Glass Company
No Drawing. Filed Dec. 5, 1960, Ser. No. 73,491
8 Claims. (Cl. 260—652.5)

This invention relates to the stabilization of methylchloroform. In particular it deals with compositions which are stabilized to prevent or minimize decomposition of methylchloroform during is industrial uses, notably degreasing.

Methylchloroform, 1,1,1-trichloroethane, is a normally liquid chlorinated hydrocarbon. Because of its low toxicity to warm blooded animals, methylchloroform is especially useful for certain applications such as those degreasing procedures in which workers would otherwise be exposed to toxic vapors. Such situations occur during degreasing operations associated with a variety of metal fabrications. Frequently small parts must be repetitively degreased during fabrication under conditions such that it is convenient to employ small cold degreasing units. Greases, oils and the like are advantageously removed from metal parts by immersing such parts in a bath of cold methylchloroform solvent.

These and other uses of methylchloroform including its use as a vapor pressure depressant require that the solvent formulation is stable under conditions of use. However, methylchloroform is particularly reactive to metals, notably to light metals typified by aluminum. This reactivity is manifest upon contact of unstabilized methylchloroform with the metal at ordinary temperatures (whether in the presence or absence of light, moisture or air) by the visible evolution of hydrogen chloride gas, color formation and, eventually, tarry polymeric residue. Whereas most chlorinated hydrocarbons may be placed in contact with metals for short periods of time, unstabilized methylchloroform may immediately enter into reaction with light metals, notably aluminum, and in particular at points on the surface where the metal article has been scratched or abraded. This extreme reactivity of methylchloroform would usually offset the advantage of its low toxicity and vitiate any advantages gained thereby if it were not possible to render the solvent much less reactive by the addition of stabilizing substances. In fact its use as a vapor phase degreasing solvent could not be entertained without stabilization.

It has now been discovered in accordance with this invention that the unique and notable tendency of methylchloroform to decompose may be minimized by the incorporation of minor concentrations of a combination of substances. Thus, methylchloroform compositions containing appropriate amounts of this combination of substances is effectively stabilized to the extent that it is commercially useful in cold degreasing operations.

According to this invention methylchloroform containing in combination a stabilizing amount of a saturated monohydric alcohol of up to 8 carbon atoms, preferably 4 to 8 carbon atoms, a hydrocarbon of from 5 to 15 carbon atoms selected from the groups of saturated aliphatic hydrocarbons, saturated cyclic hydrocarbons, unsaturated aliphatic hydrocarbons, unsaturated cyclic hydrocarbons and aromatic hydrocarbons and an acetylenic alcohol, notably 2-methyl-2-butynol are incorporated in a methylchloroform composition.

Concentrations of these substances up to as much as about 10 percent by weight of total additives but preferably from about 0.05 to 5 weight percent and desirably from about 1.0 to 3.0 weight percent of these cooperative substances may be added. By providing such a methylchloroform composition containing these certain cooperative stabilizing substances the corrosive tendency and solvent loss by decomposition may be minimized to a point such that considerably enhanced value is realized.

Many test procedures are useful in evaluating the stabilization of methylchloroform formulations. One very useful test is the "scratch test." This test can be carried out by scratching the surface of a strip of aluminum positioned beneath the surface of a quantity of methylchloroform in any suitable container. It is convenient to employ strips of clean aluminum measuring $\frac{1}{16}$ inch by $\frac{1}{2}$ inch by 2 inches. Any sharp instrument may be employed for scratching the surface. However, in practice, it is desirable to employ either a glass or stainless steel stylus to avoid introducing contamination. Almost immediately upon scratching the surface of the metal in contact with the unstabilized methylchloroform a purple coloration will appear. In unstabilized methylchloroform the purple coloration appearing at the point of abrasion will continue to develop and emanate therefrom until the entire body of the solvent is discolored and if allowed to proceed, hydrogen chloride will be evolved and carbonaceous residue will remain, often in a matter of minutes.

An adequately stabilized methylchloroform, however, will form no more than a minor amount of purple discoloration at the pinpoint of abrasion which will not proceed further. Thus, the solvent will remain light colored and free from developed acidity.

The following examples illustrate the manner in which methyl chloroform may be stabilized pursuant to this invention.

EXAMPLE I

A strip of clean aluminum measuring $\frac{1}{16}$ inch by $\frac{1}{2}$ inch by 2 inches was placed in a small bottle containing methylchloroform formulation at 25° C. A quantity of 30 cubic centimeters of methylchloroform formulation was generally sufficient to cover the metal completely. When covered, the metal was scratched with a stainless steel stylus. A number of methylchloroform formulations were tested by this procedure and the attack upon aluminum was observed as the following Table I indicates.

Table I

| Methylchloroform Formulation Containing Percent by Weight | Observation |
|---|---|
| 1.5 t-butanol | Immediate discoloration, gas evolution and rapid decomposition. |
| 1.5 2-methylbutynol | Do. |
| 2.0 n-hexane | Do. |
| 1.5 t-butanol and 1.5 2-methylbutynol | Immediate discoloration, gas evolution, often becoming black and viscous within 1 to 3 days. |
| 1-5 t-butanol and 2.0 n-hexane | Immediate discoloration, gas evolution and rapid decomposition. |
| 1.5 2-methylbutynol and 2.0 n-hexane | Do. |
| 1.5 t-butanol, 1.5 2-methylbutynol and 2.0 n-hexane | Solvent remains light colored, and free from appreciable decomposition products after 3 days. |

EXAMPLE II

Other tests were carried out substituting n-heptane for the n-hexane of Example I. The following table indicates the observed stabilizing effect.

Table II

| Methylchloroform Formulation Containing Percent by Weight | Observation |
| --- | --- |
| 1.5 t-butanol | Immediate discoloration, gas evolution and rapid decomposition. |
| 1.5 2-methylbutynol | Do. |
| 2.0 n-heptane | Do. |
| 1.5 t-butanol and 1-5 2-methylbutynol. | Immediate discoloration, often becoming black and viscous within 1 to 3 days. |
| 1.5 t-butanol and 2.0 n-heptane | Immediate discoloration, gas evolution and rapid decomposition. |
| 1.5 2-methylbutynol and 2.0 n-heptane. | Do. |
| 1.5 t-butanol, 1.5 2-methylbutynol and 2.0 n-heptane. | Solvent remains light colored, and free from appreciable decomposition products after 3 days. |

EXAMPLE III

Methylchloroform formulations were prepared to contain 1.5 grams each of tert-butyl alcohol, 2-methyl-2-butynol and 2.0 grams of a third component per 100 grams of formulation which was tested according to the procedure of Example I. The behavior of these methylchloroform formulations is tabulated below.

Table III

| Third Component | Behavior Observed in "Scratch" Test |
| --- | --- |
| None | Solvent darkens, evolves gas, often becomes tarry within three days. |
| Ethylbenzene | Discolors but remains free from tar and free from gas evolution within three days. |
| Cyclohexane | Slightly discolored but free from tar and free from gas evolution within three days. |
| n-Decane | Do. |
| 2,2,4-Trimethylpentane | Do. |
| 1-Decene | Do. |
| 4-Vinyl-1-cyclohexene | Do. |

The following example illustrates that additive concentrations other than those specifically shown in the foregoing examples are effective:

EXAMPLE IV

Methylchloroform formulations prepared with quantities of additives as indicated in Table IV were tested according to the procedure of Example I to demonstrate their stability. The results of such tests are listed in Table IV.

Table IV

| Formulation | Observation |
| --- | --- |
| 1.7% methylbutynol, 1.7% tert-butyl alcohol, 2.5% hexane. | Very little discoloration, slight precipitate, no apparent gas evolution after 24 hours. |
| 1.7% methylbutynol, 1.7% tert-butyl alcohol, 2.5% heptane. | Do. |

It has also been found in accordance with this invention that many alcohols may be employed in place of tertiary-butyl alcohol. Those of particular utility contain up to 8 carbon atoms although the preferred alcohols contain 4 to 8 carbon atoms. Tertiary alcohols often have a special utility. Secondary alcohols may be employed but generally the concentration of these which is required is greater than that which is sufficient in the case of most tertiary alcohols. Likewise, when primary alcohols are employed a greater concentration of alcohol is often required to give comparable stabilization. Preferred alcohols are tertiarybutyl alcohol,
dimethylethylcarbinol,
methyldiethylcarbinol,
dimethylpropylcarbinol,
dimethylisopropylcarbinol,
triethylcarbinol,
methylethylbutylcarbinol,
methylethylisobutylcarbinol,
methylethyl-secondary-butylcarbinol,
diethylpropylcarbinol,
diethylisopropylcarbinol,
dimethylcarbinol and ethanol.

Other monohydric aliphatic alcohols may be employed although generally these have lesser utility. Monoalkoxyalkanols such as the monomethyl ether of ethylene glycol and its related homologs, halogenated alcohols which do not themselves readily develop acidity such as 4-chloro-1-butanol, and epoxy alcohols such as glycidol may be employed but usually are somewhat less suitable and require larger quantities to be effective in a manner similar to secondary and primary alcohols.

The choice of hydrocarbon for utilization in admixture with the other components of the stabilizing formulation is largely decided by the properties sought for the final formulation. By way of illustration, pentane contributes to the acceptance of the formulation by corrosion testing, but its vapor pressure is relatively high and as a consequence will tend to evaporate from the formulation, simultaneously producing vapors above the formulation which will not be sufficiently non-flammable. Also, as a consequence of extreme difference in vapor pressure between methylchloroform and n-decane, selective volatilization of methylchloroform from degreasing formulations containing n-decane will result in alteration of the properties of the residual formulation early during the utilization of such a formulation. These altered properties will thus shorten the effective period of utilization of a formulation containing this material as the hydrocarbon component. Thus, the preferred hydrocarbons are n-hexane and n-heptane although for cold "bucket" degreasing applications a number of other hydrocarbons can be substituted.

In the pursuit of this invention many hydrocarbons can be employed. However, many of these are uneconomical or may be substituted by another hydrocarbon having specific properties rendering itself more attractive in methylchloroform formulations. Among the saturated aliphatic hydrocarbons which can be utilized are:

n-hexane,
2-methylpentane,
3-methylpentane,
2,2-dimethylbutane,
2,3-dimethylbutane,
n-heptane,
2-methylhexane,
3-methylhexane,
2,2-dimethylpentane,
2,3-dimethylpentane,
2,4-dimethylpentane,
3,3-dimethylpentane,
2,2,3-trimethylbutane,
n-octane,
2,5-dimethylhexane,
2-methylheptane,
3-methylheptane,
4-methylheptane,
2,2-dimethylhexane,
2,3-dimethylhexane,
2,4-dimethylhexane,
2,3,3-trimethylpentane,
2,3,4-trimethylpentane,
3,3-dimethylhexane,
3,4-dimethylhexane,
2,2,4-trimethylpentane,
2,2,3-trimethylpentane,
3-methyl-3-ethylpentane,
2,2,3,3-tetramethylbutane,
n-nonane,
n-decane and kerosene.

Among the unsaturated aliphatic hydrocarbons which can be utilized in this invention are: 1-hexene, 2-hexene, trans-3-hexene, 3-methyl-1-pentene, 3,3-dimethyl-1-butene, 2,4,4-trimethyl-1-pentene, 2,4,4-trimethyl-2-pentene, 1-nonene, 1-hexadecene.

Although less available, saturated cycloparaffins may also be employed. Examples of such useful compounds are cyclopentane, cyclohexane, methylcyclopentane, methylcyclohexane, ethylcyclopentane, trans-1,3-dimethylcyclopentane, cyclooctane, ethylcyclohexane, and spirodecane.

Many unsaturated cyclic hydrocarbons also have utility. These include: cyclohexene, cyclooctene, vinylcyclohexene, cyclopentadiene.

Likewise aromatic hydrocarbons may be employed as follows: benzene, toluene, ethylbenzene, o-xylene, p-xylene, cymene, cumene, propylbenzene, isopropylbenzene and napththalene.

Among the acetylenic alcohols included in this invention are: propargyl alcohol, 3-butynol, 2-butynol, 3-butyn-2-ol, 4-pentynol, 3-pentynol, 2-pentynol, 4-pentyn-2-ol, 3-pentyn-2-ol, 2-methyl-3-butyn-2-ol (2-methyl-2-butynol), 4-pentyn-2-ol, 2-methyl-3-butynol, 3-methyl-1-pentyn-3-ol, 3-ethyl-1-pentyn-3-ol, 3-methyl-1-hexyn-3-ol, 3-ethyl-1-hexyn-3-ol, 3,4-dimethyl-1-pentyn-3-ol, 3-methyl-1-heptyn-3-ol, 3,5-dimethyl-1-hexyn-3-ol, 1-ethynylcyclohexanol and other acetylenic alcohols containing no more than 8 carbon atoms. These may be employed in admixture with a suitable hydrocarbon and a suitable monohydric aliphatic alcohol.

In the practice of this invention a suitable proportion of an acetylenic alcohol, notably 2-methyl-2-butynol, a similar quantity of tert-butanol but generally below 10 weight percent of the final formulation and often less than 4 weight percent together with from 1 to 5 weight percent of a hydrocarbon selected from the group consisting of saturated aliphatic hydrocarbons, unsaturated aliphatic hydrocarbons, saturated cyclic hydrocarbons, unsaturated cyclic hydrocarbons and aromatic hydrocarbons in the methylchloroform formulation. This is accomplished as indicated in Example III supra by merely mixing the appropriately weighed quantities with the numerical remainder of methylchloroform per 100 parts of methylchloroform formulation. Not all hydrocarbons are equivalent in their stabilizing effect. By way of illustration, a formulation requiring but 2 percent n-heptane may require a larger weight percent of some other hydrocarbon. The preferred hydrocarbons, n-hexane, n-heptane and benzene, generally provide a satisfactory stabilized formulation by incorporating 2 parts by weight of hydrocarbon, 1.5 parts by weight 2-methyl-2-butynol and 1.5 parts by weight of tert-butanol in 95 parts by weight of unstabilized methylchloroform. More or less than this proportion of hydrocarbon may be employed to obtain the benefit of the invention. The addition of any amount of hydrocarbon to methylchloroform containing 2-methyl-2-butynol and tert-butyl alcohol will improve its stability and prolong its period of utility. The quantity of methylbutynol may be increased to permit a reduction in quantity of hydrocarbon employed to result in a given stabilizing effect. The methylbutynol can be reduced somewhat provided this reduction is compensated by an increased quantity of hydrocarbon. Similar alteration of the composition can be practiced with respect to the concentration of tert-butyl acohol employed.

When other alcohol is substituted for tert-butyl alcohol, similar considerations prevail. For example, isooctanol may be substituted for tert-butanol but a larger quantity of this substance is required to stabilize a formulation containing otherwise 1.5 weight percent 2-methyl-2-butynol and 2.0 weight percent n-heptane. Generally the larger molecular weight compounds require a proportionately greater amount to result in a given stabilizing effect. For this reason and reasons of economy, tert-butyl alcohol, tert-amyl alcohol, dimethyl-carbinol and ethanol are the preferred alcohols.

The invention has been described with reference to certain specific embodiments thereof but it is not intended to be construed as limited thereto except as may appear in the following claims.

I claim:

1. Methylchloroform stabilized with in combination an acetylenic alcohol having up to 8 carbon atoms, a saturated monohydric aliphatic alcohol having from 4 to 8 carbon atoms and a hydrocarbon containing from 5 to 15 carbon atoms.

2. Methylchloroform containing a stabilizing composition comprising from 0.1 to 5.0 weight percent of a saturated monohydric aliphatic alcohol containing from 4 to 8 carbon atoms based on the methylchloroform, from 0.1 to 5.0 weight percent of a hydrocarbon containing from 5 to 15 carbon atoms based on the methylchloroform and from 0.1 to 5.0 weight percent of 2-methyl-2-butynol based on the methylchloroform.

3. Methylchloroform containing a stabilizing composition comprising 2-methyl-2-butynol, a saturated monohydric aliphatic alcohol and a hydrocarbon containing from 5 to 15 carbon atoms.

4. Methylchloroform containing a stabilizing composition comprising 2-methyl-2-butynol, a saturated monohydric aliphatic alcohol containing from 4 to 8 carbon atoms and a hydrocarbon containing from 5 to 15 carbon atoms.

5. Methylchloroform containing a stabilizing concentration of tert-butyl alcohol, a stabilizing concentration of n-hexane and a stabilizing concentration of 2-methyl-2-butynol.

6. Methylchloroform containing a stabilizing concentration of tert-butyl alcohol, a stabilizing concentration of n-heptane and a stabilizing concentration of 2-methyl-2-butynol.

7. Methylchloroform containing from 0.1 to 3 weight percent of tert-butyl alcohol, from 0.1 to 3 weight percent of n-hexane and from 0.1 to 3 weight percent of 2-methyl-2-butynol.

8. Methylchloroform containing from 0.1 to 3 weight percent of tert-butyl alcohol, from 0.1 to 3 weight percent of n-heptane and from 0.1 to 3 weight percent 2-methyl-2-butynol.

References Cited by the Examiner

UNITED STATES PATENTS

| | | | |
|---|---|---|---|
| 2,947,792 | 8/60 | Skeeters | 260—652.5 |
| 3,000,978 | 9/61 | Fredenburg | 260—652.5 |

LEON ZITVER, *Primary Examiner.*

ALPHONSO D. SULLIVAN, *Examiner.*